United States Patent
Cavaliere

(10) Patent No.: US 9,525,491 B2
(45) Date of Patent: Dec. 20, 2016

(54) OPTICAL MODULATOR AND METHOD OF ENCODING COMMUNICATIONS TRAFFIC IN A MULTILEVEL MODULATION FORMAT

(75) Inventor: Fabio Cavaliere, Vecchiano (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 51 days.

(21) Appl. No.: 14/352,681

(22) PCT Filed: Oct. 19, 2011

(86) PCT No.: PCT/EP2011/068268
§ 371 (c)(1),
(2), (4) Date: Jul. 10, 2014

(87) PCT Pub. No.: WO2013/056734
PCT Pub. Date: Apr. 25, 2013

(65) Prior Publication Data
US 2014/0328601 A1    Nov. 6, 2014

(51) Int. Cl.
*H04B 10/556* (2013.01)
*H04B 10/00* (2013.01)
(Continued)

(52) U.S. Cl.
CPC ...... *H04B 10/5561* (2013.01); *H04B 10/5053* (2013.01)

(58) Field of Classification Search
CPC ............ H04B 10/5561; H04B 10/5053; H04B 10/505; H04B 10/541
(Continued)

(56) References Cited

U.S. PATENT DOCUMENTS 5,867,071 A * 2/1999 Chethik ............... H04L 27/362
332/103
7,783,203 B2 * 8/2010 Kagawa .................. H04J 14/08
398/102
(Continued)

FOREIGN PATENT DOCUMENTS

EP        2003486        12/2008

OTHER PUBLICATIONS

PCT International Search Report for PCT International Application No. PCT/EP2011/068268; dated Jul. 18, 2012. 4 pages.
(Continued)

*Primary Examiner* — Oommen Jacob
(74) *Attorney, Agent, or Firm* — NDWE LLP

(57) ABSTRACT

An optical modulator is described, comprising—an optical splitter to receive an optical carrier signal and split it into sub-signals; modulation assemblies, each comprising a binary optical modulator to apply a binary phase shift keyed (BPSK) modulation to a respective optical sub-signal to form a BPSK modulated optical sub-signal. Modulation assemblies comprise a phase-shifter, each to apply a phase shift to the respective BPSK modulated optical sub-signal in dependence on a pre-selected modulation format; an encoding apparatus to receive communications traffic to map into symbols, and to generate and transmit a respective drive signal to the optical modulator of a modulation assembly, each drive signal to cause the optical modulator to apply said BPSK modulation, to encode the symbols onto the respective optical carrier sub-signal; and a combiner to receive each BPSK modulated optical sub-signal to form an output optical signal having said multilevel modulation format.

15 Claims, 11 Drawing Sheets

(51) Int. Cl.
  *H04B 10/06* (2006.01)
  *H04B 10/50* (2013.01)
(58) Field of Classification Search
  USPC .......................................... 398/188, 182, 183
  See application file for complete search history.

(56) References Cited

U.S. PATENT DOCUMENTS

| | | | | |
|---|---|---|---|---|
| 8,805,204 B2* | 8/2014 | Zhang | ................. | H04B 10/541 398/183 |
| 8,953,949 B2* | 2/2015 | Liu | ................... | H04B 10/5053 398/182 |
| 2002/0003641 A1* | 1/2002 | Hall | ..................... | H04B 10/532 398/65 |
| 2003/0058504 A1* | 3/2003 | Cho | ..................... | H04L 7/0075 398/147 |
| 2004/0021829 A1* | 2/2004 | Griffin | ................ | H04B 10/505 353/30 |
| 2004/0141222 A1* | 7/2004 | Miyazaki | ............. | G02F 1/0121 359/237 |
| 2005/0047791 A1* | 3/2005 | Miyazaki | ............. | H04B 10/504 398/147 |
| 2005/0111581 A1* | 5/2005 | Walker | ............... | H04B 7/18513 375/308 |
| 2005/0113040 A1* | 5/2005 | Walker | ............... | H04B 7/18513 455/102 |
| 2007/0071453 A1* | 3/2007 | Liu | ..................... | H04B 10/505 398/183 |
| 2007/0206958 A1* | 9/2007 | Chen | ................... | H01Q 3/2676 398/183 |
| 2008/0294968 A1* | 11/2008 | Djordjevic | ......... | H03M 13/1111 714/801 |
| 2009/0324247 A1* | 12/2009 | Kikuchi | .................. | G02F 1/225 398/159 |
| 2010/0329600 A1* | 12/2010 | Sugiyama | .......... | G02B 6/29352 385/2 |
| 2011/0293266 A1* | 12/2011 | Aoki | ................... | H04B 10/5161 398/25 |
| 2012/0141135 A1* | 6/2012 | Yang et al. | ..................... | 398/140 |
| 2014/0328601 A1* | 11/2014 | Cavaliere | ...................... | 398/188 |

OTHER PUBLICATIONS

Takashi, Goh et al., "*Novel Flexible-Format Optical Modulator with Selectable Combinations of Carrier Numbers and Modulation Levels Based on Silica-PLC and $LiNbO_3$ Hybrid Integration.*" Optical Fiber Communication Conf 2011; Technical Digest. OFC/NFOEC; IEEE; Mar. 6, 2011; 3 pages; XP031946713.

Yamazaki, H. et al., "*Multilevel Optical Modulator with PLC and $LiNbO_3$ Hybrid Integrated Circuit.*" Optical Fiber Communication Conf 2011; Techical Digest. OFC/NFOEC; IEEE; Mar. 6, 2011; 3 pages; XP031946712.

Yamazaki, H. et al., "*Modulation-level-selectable Optical Modulator with a Hybrid Configuration of Silica PLCs and $LinbO_3$ Phase Modulators.*" Optical Communication (ECOC); 2010 36th European Conf and Exhibition; IEEE; Piscataway, NJ. Sep. 19, 2010; 3 pages; XP031789704.

International Preliminary Report on Patentability, Application No. PCT/EP2011/068268, dated Apr. 22, 2014, 8 pages.

PCT Written Opinion of the International Searching Authority for PCT Counterpart Application No. PCT/P2011/068268, (Apr. 19, 2014), 6 pages.

* cited by examiner

BPSK

QPSK or 4QAM

8PSK

16QAM

OPTICAL MODULATOR AND METHOD OF ENCODING COMMUNICATIONS TRAFFIC IN A MULTILEVEL MODULATION FORMAT

CROSS-REFERENCE TO RELATED APPLICATIONS

This application is a National stage of International Application No. PCT/EP2011/068268, filed Oct. 19, 2011, which is hereby incorporated by reference.

TECHNICAL FIELD

The invention relates to an optical modulator. The invention further relates to an optical transmitter comprising the optical modulator. The invention further relates to a communications network node comprising the optical modulator. The invention further relates to a method of encoding communications traffic bits onto an optical carrier signal in a multilevel modulation format.

BACKGROUND

Multi-level modulation formats, such as quadrature phase shift keying, QPSK, and 16-quadrature amplitude modulation, 16QAM, are widely used for high speed (>40 Gbit/s) transmission in fiber to cope with the bandwidth limitations introduced by optical and electronics devices at the transmitter (modulator driver, optical modulator) and the receiver (photodiodes, trans-impedance and limiting amplifiers). Although a single phase modulator could in principle be used to phase modulate signals in binary phase shift keying, BPSK, QPSK or 8-PSK modulation formats, this is not a practical option due to the high driving voltage required and the narrow modulation bandwidth. IQ modulators, based on two Mach-Zehnder modulators whose optical outputs are $\pi/2$ phase shifted relative to each other and then coupled, are commonly used instead to implement these modulation formats. An IQ modulator allows, in principle, an arbitrary set of complex line symbols, modulated in both phase and amplitude (a "constellation"), to be generated. 16QAM is a typical example of a modulation format that cannot be generated using a single phase or amplitude modulator but which can be generated using an IQ modulator driven with multilevel driving signals. However, the need for multi-level driving signals may be problematic, and IQ modulators also face the problems of requiring linear electrical amplifiers, being difficult to realize at high radio-frequencies, and that they may require complicated coding rules to map a sequence of traffic bits of a client signal into a complex constellation symbol.

An optical modulator able to implement QPSK, 8-PSK, 8QAM and 16QAM modulation formats has been reported by Yamazaki, H. (NTT Photonics Labs) et al, "Modulation-level-selectable optical modulator with a hybrid configuration of silica PLCs and LiNbO3 phase modulators", ECOC, 19-23 Sep. 2010, which comprises a lattice configuration of Mach-Zehnder modulators and enables modulation-level switching (from 4, 8 and 16 levels) using tunable optical couplers to change the number of Mach-Zehnder modulators that contribute to the modulation.

SUMMARY

It is an object to provide an improved optical modulator. It is a further object to provide an improved optical transmitter. It is a further object to provide an improved communications network node. It is a further object to provide an improved method of encoding communications traffic bits onto an optical carrier signal in a multilevel modulation format.

A first aspect of the invention provides an optical modulator comprising an optical splitter, a plurality of modulation assemblies, encoding apparatus, an output and a combiner. The optical splitter is arranged to receive an optical carrier signal and is arranged to split the optical carrier signal into a plurality of optical carrier sub-signals. Each modulation assembly is arranged to receive a respective said optical carrier sub-signal. Each modulation assembly comprises a binary optical modulator arranged to receive the respective optical carrier sub-signal and arranged to apply a binary phase shift keyed, BPSK, modulation to said optical carrier sub-signal to form a respective BPSK modulated optical sub-signal. A plurality of the modulation assemblies comprise a phase-shifter. Each phase-shifter is arranged to receive a respective BPSK modulated optical sub-signal and is arranged to apply a respective phase shift to the respective BPSK modulated optical sub-signal in dependence on a pre-selected multilevel modulation format. The encoding apparatus is arranged to receive communications traffic bits to be transmitted and is arranged to map each bit into a respective symbol of the multilevel modulation format. The encoding apparatus is arranged to generate and transmit a respective drive signal to the binary optical modulator of a respective modulation assembly. Each drive signal is arranged to cause the respective binary optical modulator to apply said BPSK modulation to thereby encode the symbol onto the respective optical carrier sub-signal. The combiner is arranged to receive each BPSK modulated optical sub-signal from the respective modulation assembly and is arranged to deliver each said sub-signal to the output to thereby form an output optical signal having said multilevel modulation format.

The optical modulator may enable communications traffic to be encoded onto an optical carrier signal in a pre-selected multilevel modulation format by superposing a plurality of BPSK modulated optical carrier signals which are phase shifted relative to one another. The optical modulator may be used to generate a PSK modulated optical signal having a symbol constellation which is symmetric about the origin of the constellation, that is a constellation where for each symbol (I,Q) a corresponding symbol (−I,−Q) exists.

The optical modulator may therefore enable communications traffic to be encoded in a multilevel modulation format using only simple binary optical modulators arranged to apply BPSK modulation.

In an embodiment, the optical modulator further comprises a modulation format controller arranged to select the pre-selected multilevel modulation format from a set of multilevel modulation formats. The optical modulator may be configured to operate with one of a set of multilevel modulation formats, and may therefore enable flexible selection of multilevel modulation format. The optical modulator may therefore operate as a reconfigurable, adaptive multi-level modulator. The optical modulator may therefore enable the generation of multiple modulation formats and may be used within a flexible optical interface in an optical communications network to enable the modulation format to be selected in response to one or more operating parameters of a communications network.

In an embodiment, the modulation format controller is arranged to select the multilevel modulation format in dependence on at least one of communications traffic capacity of a communications network and a distance over which the communications traffic bits are to be transmitted. The optical modulator may therefore enable the modulation format to be selected in response to one or more operating parameters of a communications network.

In an embodiment, the optical modulator comprises a first plurality, N, of modulation assemblies and at least a second plurality, N−1, of the modulation assemblies each comprise a phase-shifter. Each phase-shifter is arranged to apply a respective phase shift. The optical modulator may be used to implement PSK modulation formats having a symbol constellation which is symmetric about the origin of the constellation, that is a constellation where for each symbol (I,Q) a corresponding symbol (−I,−Q) exists, such as BPSK, QPSK and 8PSK. In an embodiment, each modulation assembly comprises a phase-shifter.

In an embodiment, each phase-shifter comprises a variable phase-shifter. The optical modulator further comprises a phase shift controller arranged to generate and transmit a respective phase shift control signal to each variable phase-shifter. Each phase shift control signal is arranged to cause the respective variable phase-shifter to be arranged to apply a respective phase shift in dependence on the pre-selected multilevel modulation format. The optical modulator may be simply reconfigured to any of the set of multilevel modulation formats by generating and transmitting phase shift control signals.

In an embodiment, a plurality of the modulation assemblies further comprise a gain element arranged to apply one of a positive gain and a negative gain to the respective optical carrier sub-signal. In an embodiment, each gain element comprises one of an optical amplifier and an optical attenuator. In an embodiment, each gain element comprises a semiconductor optical amplifier. In an embodiment, each modulation assembly further comprises a variable gain element arranged to apply one of a positive gain, a negative gain and zero gain to the respective optical carrier sub-signal. The optical modulator further comprises a gain controller arranged to generate and transmit a respective gain control signal to each variable gain element. Each gain control signal is arranged to cause the respective variable gain element to be arranged to apply a respective gain in dependence on the pre-selected multilevel modulation format. The optical modulator may be configured to implement multilevel modulation formats for which the amplitude values are not the same for all symbols. The optical modulator may be configured to implement multilevel modulation formats having sixteen modulation levels, such as 16QAM, or higher.

In an embodiment, each variable gain element comprises a variable optical attenuator. The optical modulator may be simply reconfigured to any of the set of multilevel modulation formats by changing the gain of the respective variable gain elements.

In an embodiment, each gain element is provided after the respective BPSK modulator. In an embodiment, each gain element is provided before the respective BPSK modulator.

In an embodiment, the pre-selected multilevel modulation format has an even number of symbols. The encoding apparatus is arranged to receive a plurality of communications bits and the encoding apparatus is arranged to map each communications bit into a corresponding index number pair, b,m, where b is indicative of a binary drive signal to be provided to the binary optical modulator of the respective modulation assembly, m. The optical modulator may be operated with binary drive signals and may therefore avoid any requirement for linear electrical amplifiers, such as are required for multilevel driving signals. The encoding apparatus may therefore comprise simple electrical encoding circuits.

In an embodiment, each binary modulator is one of a phase modulator, a Mach-Zehnder modulator and an IQ modulator.

In an embodiment, the optical modulator further comprises an output optical amplifier provided after the combiner. This may enable insertion loss incurred at the optical splitter to be compensated for. In an embodiment, the output optical amplifier comprises one of a semiconductor optical amplifier and an erbium doped fibre amplifier.

In an embodiment, the optical modulator is a photonic integrated circuit device. The optical modulator may be integrated within a single optical chip which may provide for a cost effective implementation.

In an embodiment, the encoding apparatus is arranged to select a respective said modulation assembly to encode each symbol. The optical modulator may be simply reconfigured to any of the set of multilevel modulation formats by selecting appropriate modulation assemblies for operation. The optical modulation may also be operated such that only one modulator is active at a time, to thereby encode one symbol at a time.

In an embodiment, each drive signal is a binary level drive signal. The optical modulator may be operated with binary drive signals and may therefore avoid any requirement for linear electrical amplifiers, such as are required for multilevel driving signals. The encoding apparatus may therefore comprise simple electrical encoding circuits.

A second aspect of the invention provides a method of encoding communications traffic bits onto an optical carrier signal in a multilevel modulation format. The method comprises receiving an optical carrier signal and splitting the optical carrier signal into a plurality of optical carrier sub-signals. The method further comprises receiving communications traffic bits to be transmitted and mapping each bit into a respective symbol of a pre-selected multilevel modulation format. Each symbol is encoded onto a respective optical carrier sub-signal by applying a binary phase shift keyed, BPSK, modulation to said optical carrier sub-signal to form a respective BPSK modulated optical sub-signal. A respective phase shift is applied to each of a plurality of the BPSK modulated optical carrier sub-signals in dependence on the multilevel modulation format. Each BPSK modulated optical carrier sub-signal is then delivered to a common output to thereby form an output optical signal having said multilevel modulation format.

The method may enable communications traffic to be encoded onto an optical carrier signal in a pre-selected multilevel modulation format by superposing a plurality of BPSK modulated optical carrier signals which are phase shifted relative to one another. The method may be used to generate a PSK modulated optical signal having a symbol constellation which is symmetric about the origin of the constellation, that is a constellation where for each symbol (I,Q) a corresponding symbol (−I,−Q) exists. The method may enable communications traffic to be encoded in a multilevel modulation format using only simple BPSK modulation.

In an embodiment, the method comprises selecting the pre-selected multilevel modulation format from a set of multilevel modulation formats. The method may therefore enable flexible selection of multilevel modulation format. The method may therefore provide a reconfigurable, adaptive multilevel modulation format. The method may therefore enable the generation of multiple modulation formats and may be used to enable the modulation format to be selected in response to one or more operating parameters of a communications network.

In an embodiment, the multilevel modulation format is selected in dependence on at least one of communications traffic capacity of a communications network and a distance over which the communications traffic bits are to be transmitted. The method may enable a modulation format to be selected in response to one or more operating parameters of a communications network.

In an embodiment, the optical carrier signal is split into a plurality, N, of optical carrier sub-signals and a respective phase shift is applied to each of at least a second plurality, N−1, of the BPSK modulated optical carrier sub-signals. The method may be used to implement PSK modulation formats having a symbol constellation which is symmetric about the origin of the constellation, that is a constellation where for each symbol (I,Q) a corresponding symbol (−I,−Q) exists, such as BPSK, QPSK and 8PSK. In an embodiment, a phase shift is applied to each BPSK modulated optical carrier sub-signal.

In an embodiment, one of a positive gain and a negative gain is applied to a plurality of the optical carrier sub-signals.

In an embodiment, a respective gain is applied to each optical carrier sub-signal in dependence on the pre-selected multilevel modulation format, the gain being one of a positive gain, a negative gain and zero gain. The method may implement multilevel modulation formats for which the amplitude values are not the same for all symbols. The method may implement multilevel modulation formats having sixteen modulation levels, such as 16QAM, or higher.

In an embodiment, a respective gain is applied to each BPSK modulated optical carrier sub-signal in dependence on the pre-selected multilevel modulation format, the gain being one of a positive gain, a negative gain and zero gain.

In an embodiment, the pre-selected multilevel modulation format has an even number of symbols. The method comprises receiving a plurality of communications bits and mapping each communications bit into a corresponding index number pair, b,m, where b is indicative of a binary drive signal to be provided to a binary optical modulator of a respective modulation assembly, m, arranged to apply said BPSK modulation to the respective optical carrier sub-signal. The method may be implemented with binary drive signals and may therefore avoid any requirement for linear electrical amplification, such as is required for multilevel driving signals. The method may therefore be implemented using simple electrical encoding circuits.

In an embodiment, the output optical signal is amplified. This may enable insertion loss incurred during splitting of the optical signal to be compensated for.

A third aspect of the invention provides an optical transmitter comprising:

an optical source arranged to generate an optical carrier signal; and an optical modulator as described above and arranged to receive the optical carrier signal.

A fourth aspect of the invention provides a communications network node comprising an optical modulator as described above.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of encoding communications traffic bits onto an optical carrier signal in a multilevel modulation format.

DETAILED DESCRIPTION

Figure 1:
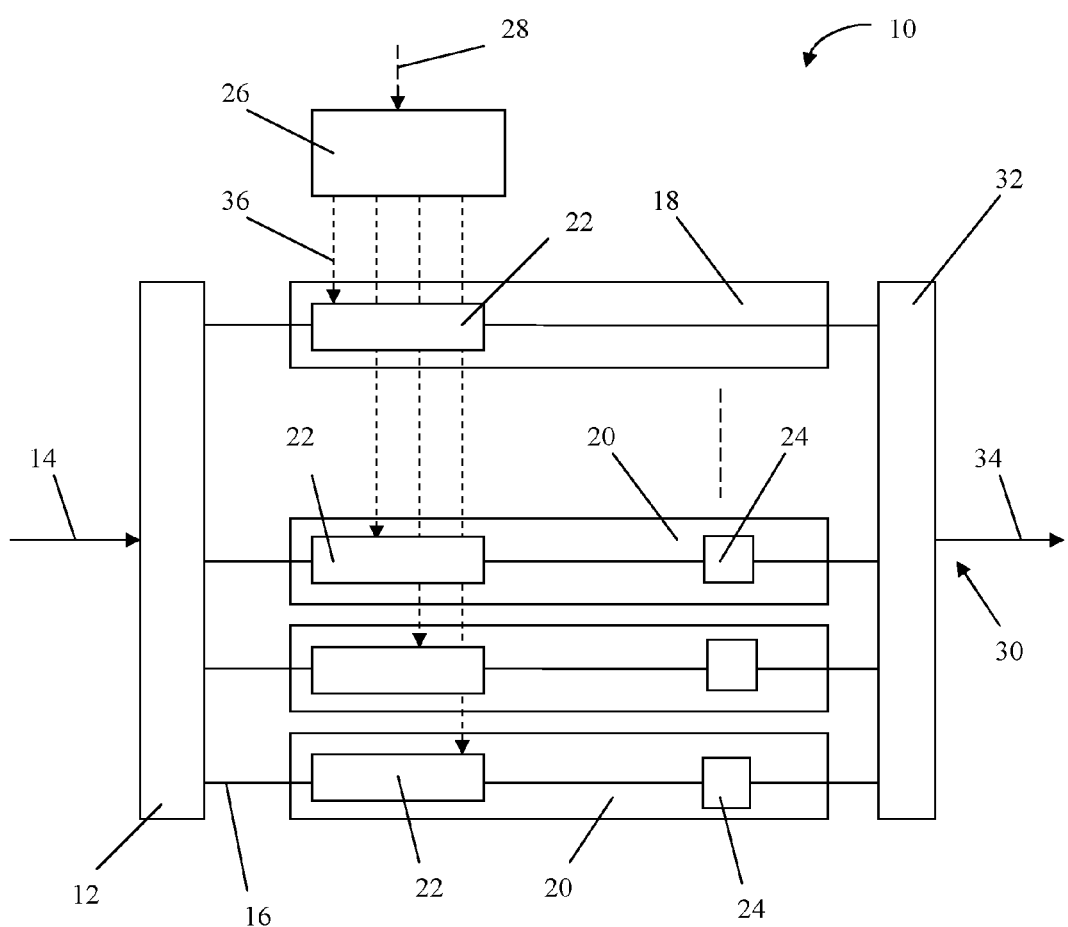
FIG. 1 is a schematic representation of an optical modulator according to a first embodiment of the invention.

FIG. 1 shows an optical modulator 10 according to a first embodiment of the invention. The optical modulator 10 comprises an optical splitter 12, a plurality of modulation assemblies 18, 20, encoding apparatus 26, an output 30 and a combiner 32.

The optical splitter 12 is arranged to receive an optical carrier signal 14 and to split the optical carrier signal into a plurality of optical carrier sub-signals 16. The optical splitter 12 power splits the optical carrier signal 14 into optical carrier sub-signals of substantially equal optical power.

The modulation assemblies 18, 20 are provided in an array configuration and each is arranged to receive a respective optical carrier sub-signal 16 from the optical splitter 12. Each modulation assembly comprises a binary optical modulator 22 which is arranged to receive its respective optical carrier sub-signal and to apply a binary phase shift keyed, BPSK, modulation to the optical carrier sub-signal to form a respective BPSK modulated optical sub-signal. A plurality of the modulation assemblies 20 additionally comprise a phase-shifter 24. Each phase-shifter 24 is arranged to receive its respective BPSK modulated optical sub-signal from its respective binary optical modulator 22 and is arranged to apply a respective phase shift to its BPSK modulated optical sub-signal. Each phase shifter 24 is arranged to apply a respective phase shift in dependence on a pre-selected multilevel modulation format.

The encoding apparatus 26 is arranged to receive communications traffic bits 28 to be transmitted. The encoding apparatus is arranged to map each bit into a respective symbol of the multilevel modulation format. The encoding apparatus is arranged to generate and transmit a respective drive signal 36 to the binary optical modulator 22 of a respective modulation assembly 18, 20. Each drive signal is arranged to cause the respective binary optical modulator to apply a BPSK modulation to the respective optical carrier sub-signal, to thereby encode the symbol onto the optical carrier sub-signal.

The combiner 32 is arranged to receive each BPSK modulated optical sub-signal from the respective modulation assembly 18, 20. The combiner 32 is arranged to deliver each BPSK modulated optical sub-signal to the output 30 to thereby form an output optical signal 34 having the selected multilevel modulation format.

The optical modulator 32 may be used to generate any arbitrary M-PSK modulated optical signal having a symbol constellation which is symmetric about the origin of the constellation, that is a constellation where for each symbol (I,Q) a corresponding symbol (−I,−Q) exists.

Figure 2:
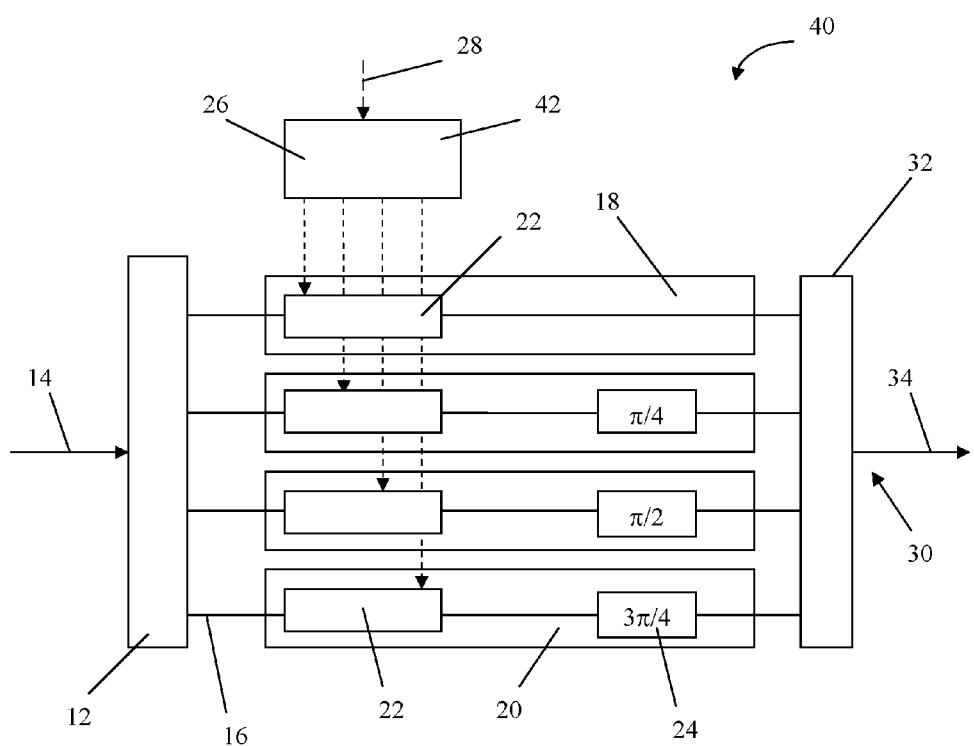
FIG. 2 is a schematic representation of an optical modulator according to a second embodiment of the invention.

An optical modulator 40 according to a second embodiment of the invention is shown in FIG. 2. The optical modulator 40 of this embodiment is similar to the optical modulator 10 of FIG. 1, with the following modifications. The same reference numbers are retained for corresponding features.

In this embodiment, the optical modulator 40 comprises four, N, modulation assemblies 18, 20. A first modulation assembly 18 does not have a phase-shifter while the remaining three, N−1, modulation assemblies 20 each comprise a phase-shifter 24. The phase-shifters 24 are each arranged to apply a respective phase shift. In this example, one phase-shifter is arranged to apply a π/4 phase shift, a second phase-shifter is arranged to apply a π/2 phase shift, and a third phase-shifter is arranged to apply a 3π/4 phase shift.

The optical modulator 40 further comprises a modulation format controller 42 which is arranged to select a multilevel modulation format from a set of multilevel modulation formats. In this example, the configuration of the three phase-shifters means that the optical modulator 40 may be operated to implement one of BPSK, QPSK and 8PSK modulation. The modulation format controller 42 is therefore arranged to select a multilevel modulation format for operation from one of these three modulation formats.

Figure 5:
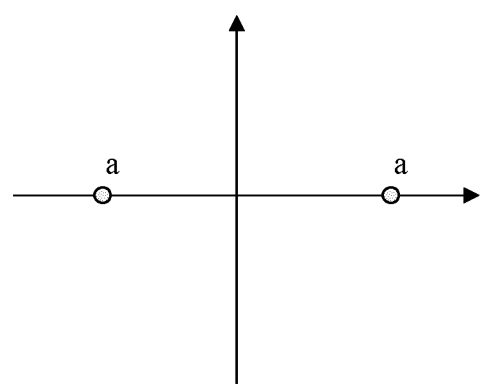
FIG. 5 shows constellation diagrams for BPSK, QPSK or 4QAM, 8PSK and 16 QAM modulation formats, generated using the optical modulators shown in FIGS. 2 and 3.
Figure 5:
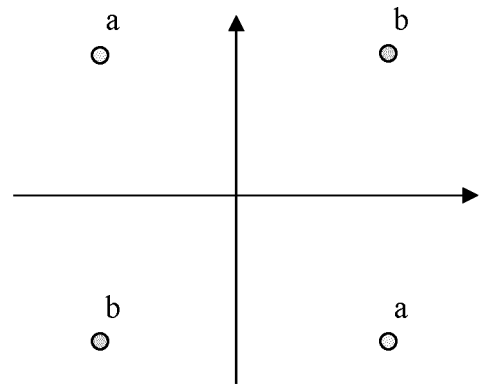
Figure 5:
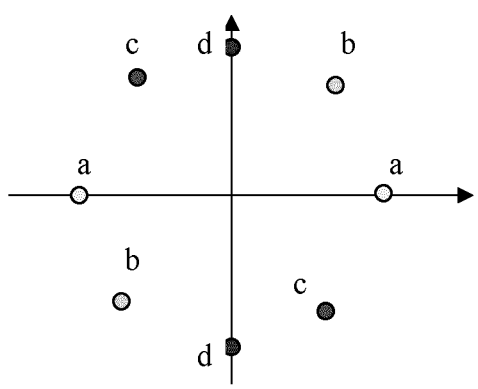
Figure 5:
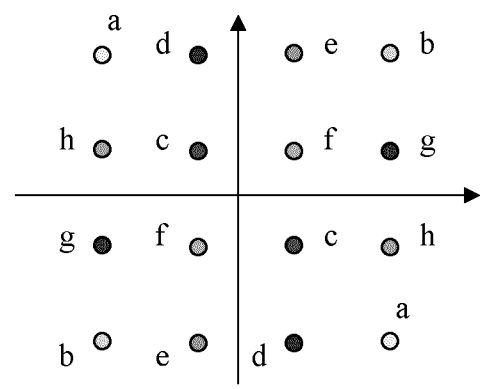

The encoding apparatus 26 is arranged to generate and transmit drive signals to the appropriate binary optical modulators 22 to implement the selected modulation format, as follows. To implement BPSK modulation drive signals are sent to the first modulation assembly 18. To implement QPSK, modulation drive signals are sent to the modulation assemblies 20 having π/4 and π/4 phase shifts. To implement 8PSK, modulation drive signals are sent to each of the modulation assemblies 18, 20. Constellation diagrams for each of BPSK, QPSK and 8PSK are shown in FIG. 5. Symbols in a constellation diagram having the same identification letter are generated by the same binary optical modulator 22. As can be seen from the constellation diagrams for BPSK, QPSK and 8PSK, the constellation diagrams of these modulation formats are symmetric about their origins, that is to say for each symbol (I,Q) a corresponding symbol (−I,−Q) exists.

Figure 3:
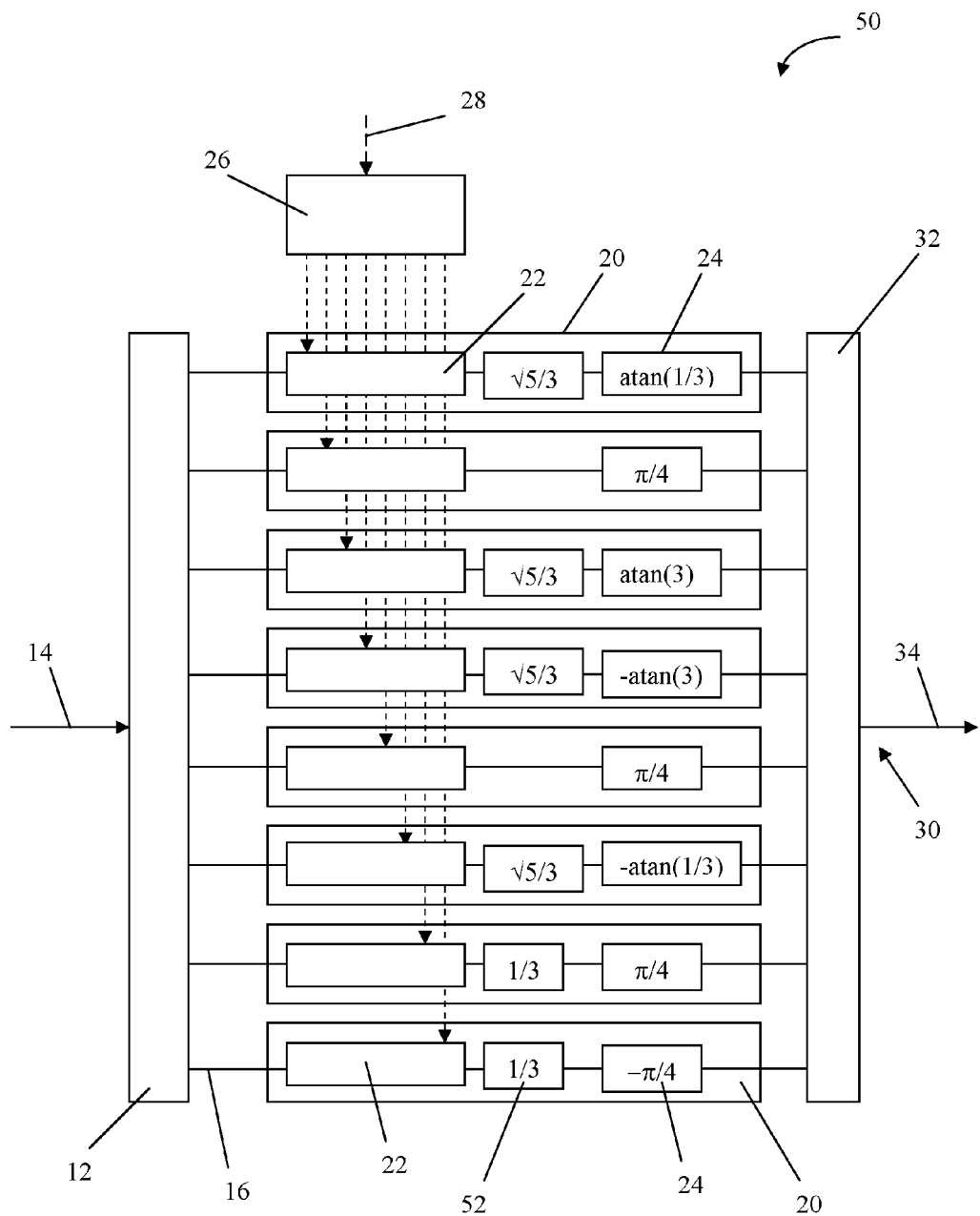
FIG. 3 is a schematic representation of an optical modulator according to a third embodiment of the invention.

An optical modulator 50 according to a third embodiment of the invention is shown in FIG. 3. The optical modulator 50 of this embodiment is similar to the optical modulator 10 of FIG. 1, with the following modifications. The same reference numbers are retained for corresponding features.

In this embodiment, the optical modulator 50 comprises eight modulation assemblies 20, each of which has a phase-shifter 24. The phase-shifters 24 are each arranged to apply a respective phase shift. In this example, (from top to bottom as shown in the drawing) the first phase-shifter is arranged to apply a atan(⅓) phase shift, the second, fifth and seventh phase-shifters are each arranged to apply a π/4 phase shift, the third phase-shifter is arranged to apply a atan(3) phase shift, the fourth phase-shifter is arranged to apply a −atan(3) phase shift, the sixth phase-shifter is arranged to apply a −atan(⅓) phase shift, and the eighth phase-shifter is arranged to apply a −π/4 phase shift.

Six of the modulation assembles 20 additionally comprise a gain element 52. In this example, each gain element 52 comprises an optical attenuator is arranged to apply a negative gain (attenuation). From top to bottom as shown in the drawing, the first, third, fourth and sixth gain elements 52 are each arranged to apply an attenuation of √5/3 and the seventh and eighth gain elements 52 are each arranged to apply an attenuation of ⅓.

The optical modulator 50 of this embodiment is configured to implement the 16QAM modulation format. A constellation diagram for 16QAM is shown in FIG. 5. Symbols having the same identification letter are generated by the same binary optical modulator 22. The constellation diagram for 16 QAM is symmetric about its origin.

Figure 4:
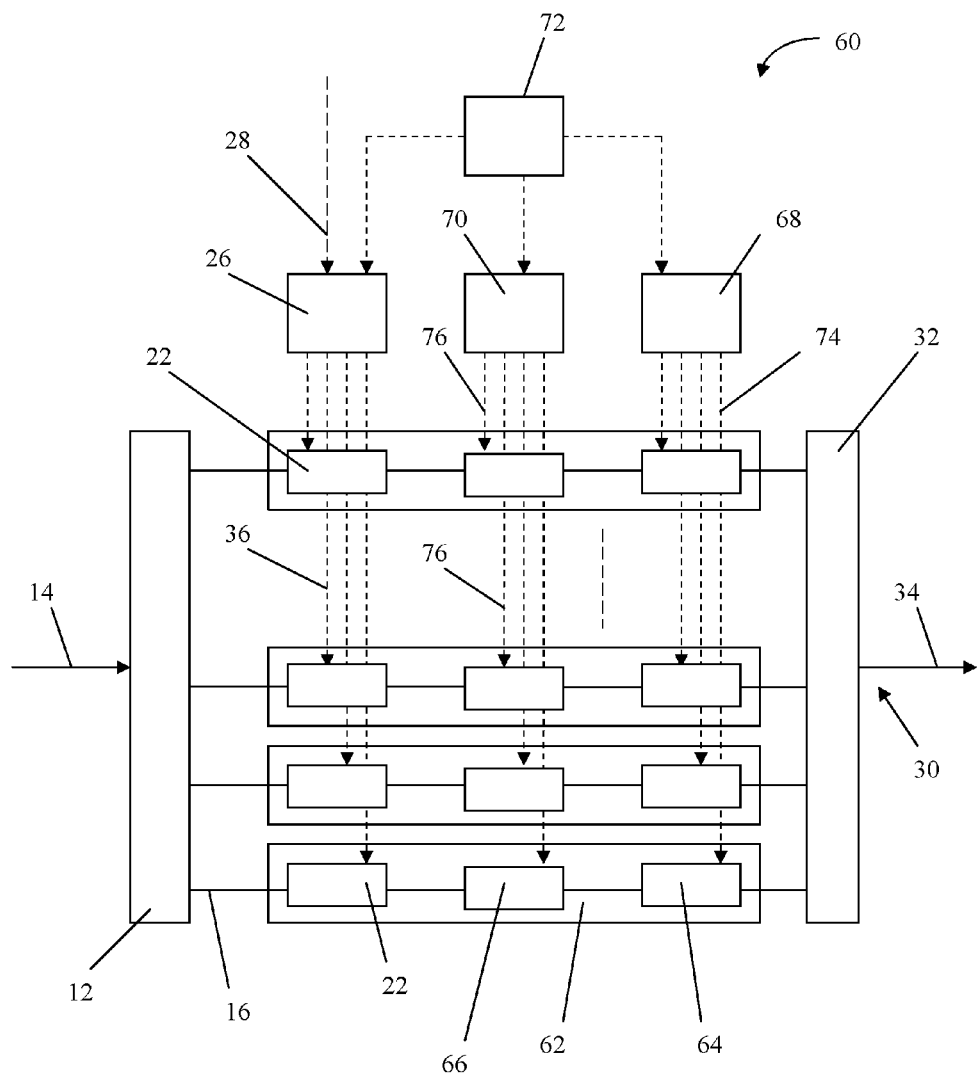
FIG. 4 is a schematic representation of an optical modulator according to a fourth embodiment of the invention.

An optical modulator 60 according to a fourth embodiment of the invention is shown in FIG. 4. The optical modulator 60 of this embodiment is similar to the optical modulator 10 of FIG. 1, with the following modifications. The same reference numbers are retained for corresponding features.

In this embodiment, each modulation assembly 62 comprises a binary optical modulator 22, a phase-shifter 64 and a gain element 66.

Each phase-shifter 64 is a variable phase-shifter and the optical modulator 60 further comprises a phase shift controller 68. The phase shift controller 68 is arranged to generate and transmit a respective phase shift control signal 74 to each variable phase-shifter. Each phase shift control signal is arranged to cause the respective variable phase-shifter 64 to be arranged to apply a respective phase shift in dependence on the pre-selected multilevel modulation format.

Each gain element 66 comprises a variable gain element. Each variable gain element is arranged to apply one of a positive gain, a negative gain and zero gain to the respective optical carrier sub-signal. The optical modulator 60 further comprises a gain controller 70 arranged to generate and transmit a respective gain control signal 76 to each variable gain element 66. Each gain control signal is arranged to cause the respective variable gain element to be arranged to apply a respective gain in dependence on the pre-selected multilevel modulation format.

The optical modulator 60 additionally comprises a modulation format controller 72 which is arranged to select a multilevel modulation format from a set of multilevel modulation formats. The modulation format controller 72 generates and transmits modulation format control signals, comprising an indication of the selected modulation format, to each of the encoding apparatus 26, the phase shift controller 68 and the gain controller 70.

In this example, the variable phase-shifters 64 and the variable gain elements 66 may be configured so that the optical modulator 60 may be operated to implement one of a preselected set of multilevel modulation formats. The optical modulator 60 may be operated to generate any arbitrary M-PSK modulated optical signal having a symbol constellation which is symmetric about the origin of the constellation, including BPSK, QPSK, 8PSK and 16QAM. It will be appreciated that the optical modulator 60 may therefore be configured to look like the optical modulator 40 of FIG. 2 by configuring the variable phase-shifter in a first modulation assembly 62 to apply a zero phase shift and by configuring the variable phase-shifters in three other modulation assemblies 62 to have the π/4, π/2 and 3π/4 phase shifts shown in FIG. 2. The variable gain elements 66 in each of the four selected modulation assemblies are configured to apply zero gain. The encoding apparatus 26 generates and transmits drive signals only to the binary optical modulators 22 of the modulation assemblies 62 which have been configured for operation. The optical modulation 60 may similarly be configured to implement 16QAM by configuring the variable phase-shifters 64 to have the phase shifts of the optical modulator 50 of FIG. 3 and by configuring six of the variable gain elements 66 to apply the attenuations shown in FIG. 3.

The encoding apparatus 26 is arranged to receive a plurality of communications bits which are to be encoded into a pre-selected multilevel modulation format having an even number of symbols. The encoding apparatus is arranged to map each communications bit into a corresponding index number pair, b,m. b is indicative of a binary drive signal, for example a binary drive signal selected from the set −1, 1 or the set 0,1. m is indicative of the modulation assembly of which the binary optical modulator is to be driven by the drive signal. Each bit is therefore encoded into a respective symbol of the selected modulation format by driving the binary optical modulator 22 of the m-th modulation assembly 62 with a binary drive signal −1 or 1 (or alternatively, 0 or 1). By combining the BPSK modulation optical carrier sub-signals through the combiner 32 each symbol in the constellation diagram of the selected multilevel modulation format is provided. The symbols are generated serially by generating and transmitting one drive signal at a time, so that one binary optical modulator 22 is operated at a time. The phase position and amplitude of a symbol within the constellation diagram is controlled by controlling the phase shift and gain applied by the respective modulation assembly 62 which generated the symbol.

Figure 6:
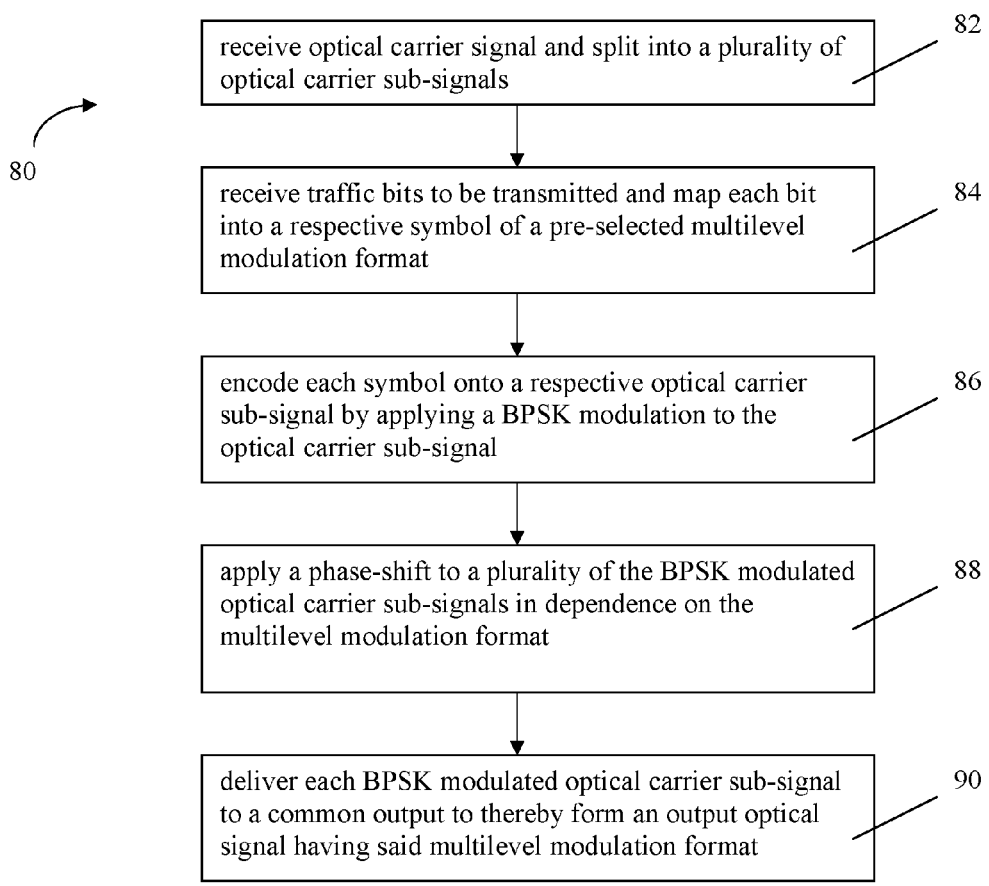
FIG. 6 shows the steps of a method of encoding communications traffic bits onto an optical carrier signal in a multilevel modulation format according to a fifth embodiment of the invention.

A fifth embodiment of the invention provides a method 80 of encoding communications traffic bits onto an optical carrier signal in a multilevel modulation format. The steps of the method 80 are shown in FIG. 6.

The method 80 comprises:
receiving an optical carrier signal and splitting the optical carrier signal into a plurality of optical carrier sub-signals 82;
receiving communications traffic bits to be transmitted and mapping each bit into a respective symbol of a pre-selected multilevel modulation format 84;
encoding each symbol onto a respective optical carrier sub-signal by applying a binary phase shift keyed, BPSK, modulation to said optical carrier sub-signal to form a respective BPSK modulated optical sub-signal 86;
applying a respective phase-shift to each of a plurality of the BPSK modulated optical carrier sub-signals in dependence on the multilevel modulation format 88; and
delivering each BPSK modulated optical carrier sub-signal to a common output to thereby form an output optical signal having said multilevel modulation format 90.

The method 80 may be used to generate any arbitrary M-PSK modulated optical signal having a symbol constellation which is symmetric about the origin of the constellation, that is a constellation where for each symbol (I,Q) a corresponding symbol (−I,−Q) exists.

Figure 7:
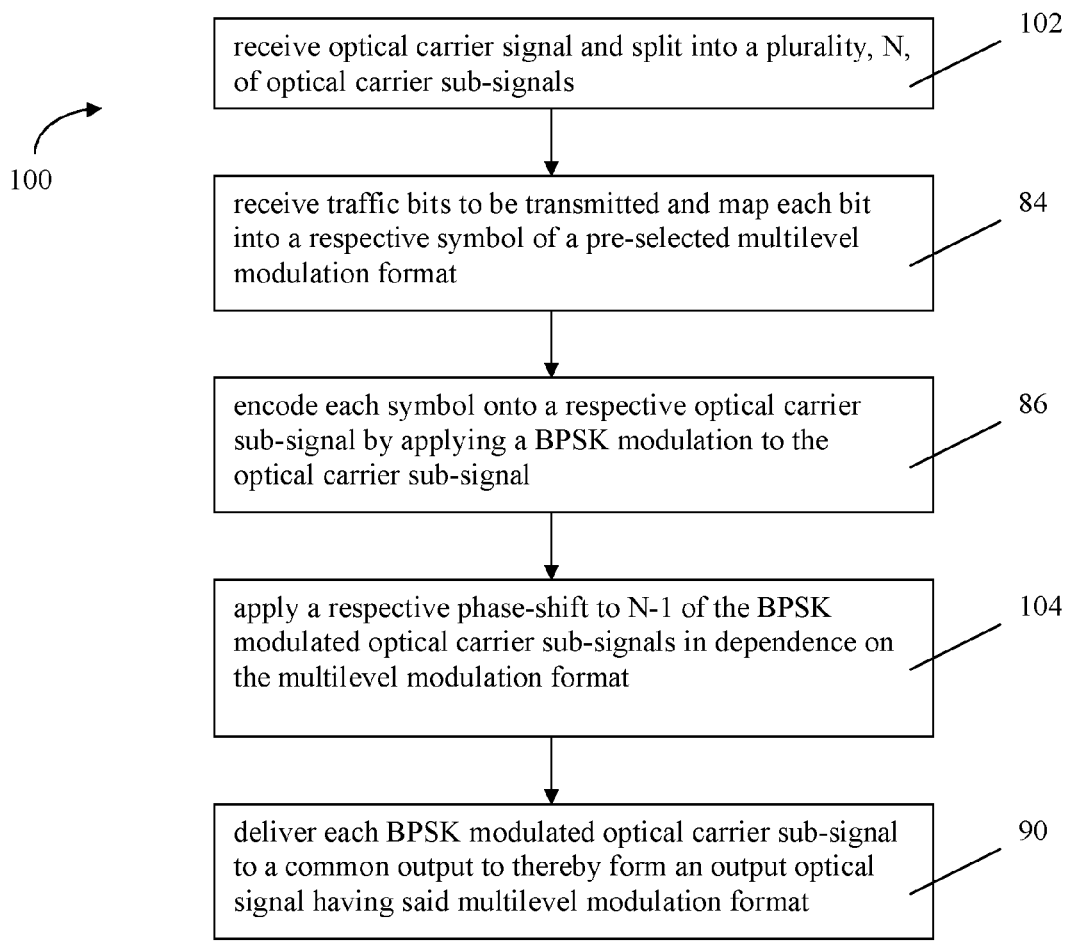
FIG. 7 shows the steps of a method of encoding communications traffic bits onto an optical carrier signal in a multilevel modulation format according to a sixth embodiment of the invention.

FIG. 7 shows the steps of a method 100 of encoding communications traffic bits onto an optical carrier signal in a multilevel modulation format according to a sixth embodiment of the invention. The method 100 of this embodiment is similar to the method 80 of the previous embodiment, with the following modifications. The same reference numbers are retained for corresponding steps.

In this embodiment, the method comprises selecting the pre-selected multilevel modulation format from a set of multilevel modulation formats.

The optical carrier signal is split into a plurality, N, of optical carrier sub-signals 102. A respective phase-shift is applied to each of at least a second plurality, N−1, of the BPSK modulated optical carrier sub-signals 104.

Figure 8:
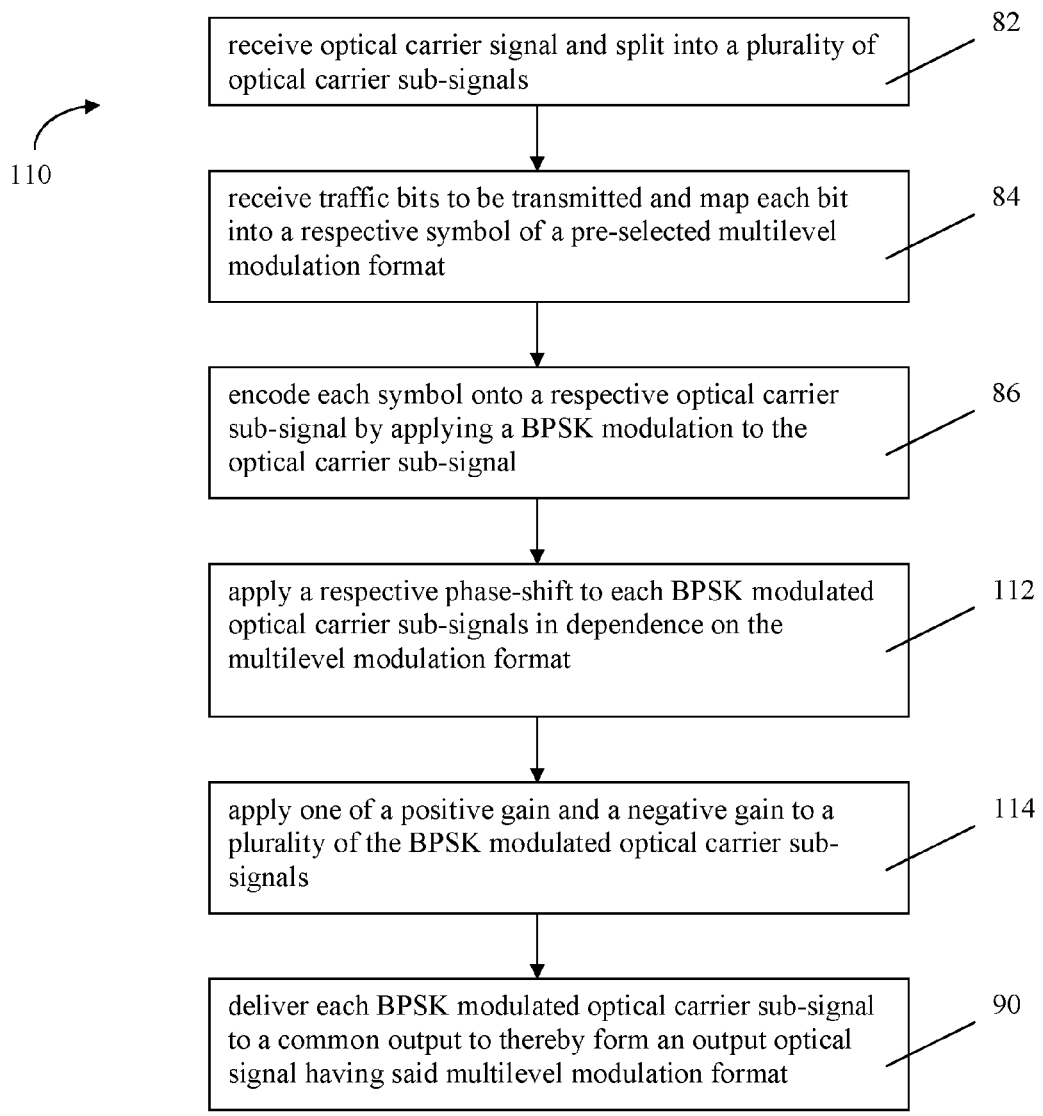
FIG. 8 shows the steps of a method of encoding communications traffic bits onto an optical carrier signal in a multilevel modulation format according to a seventh embodiment of the invention.

A seventh embodiment of the invention provides a method 110 of encoding communications traffic bits onto an optical carrier signal in a multilevel modulation format. The steps of the method 110 are shown in FIG. 8. The method of this embodiment is similar to the method 80 of the fifth embodiment, with the following modifications. The same reference numbers are retained for corresponding steps.

In this embodiment, a respective phase shift is applied to each BPSK modulated optical carrier sub-signal in dependence on the selected modulation format 112. Either a positive gain or a negative gain is applied to a plurality of the optical carrier sub-signals 114.

Figure 9:
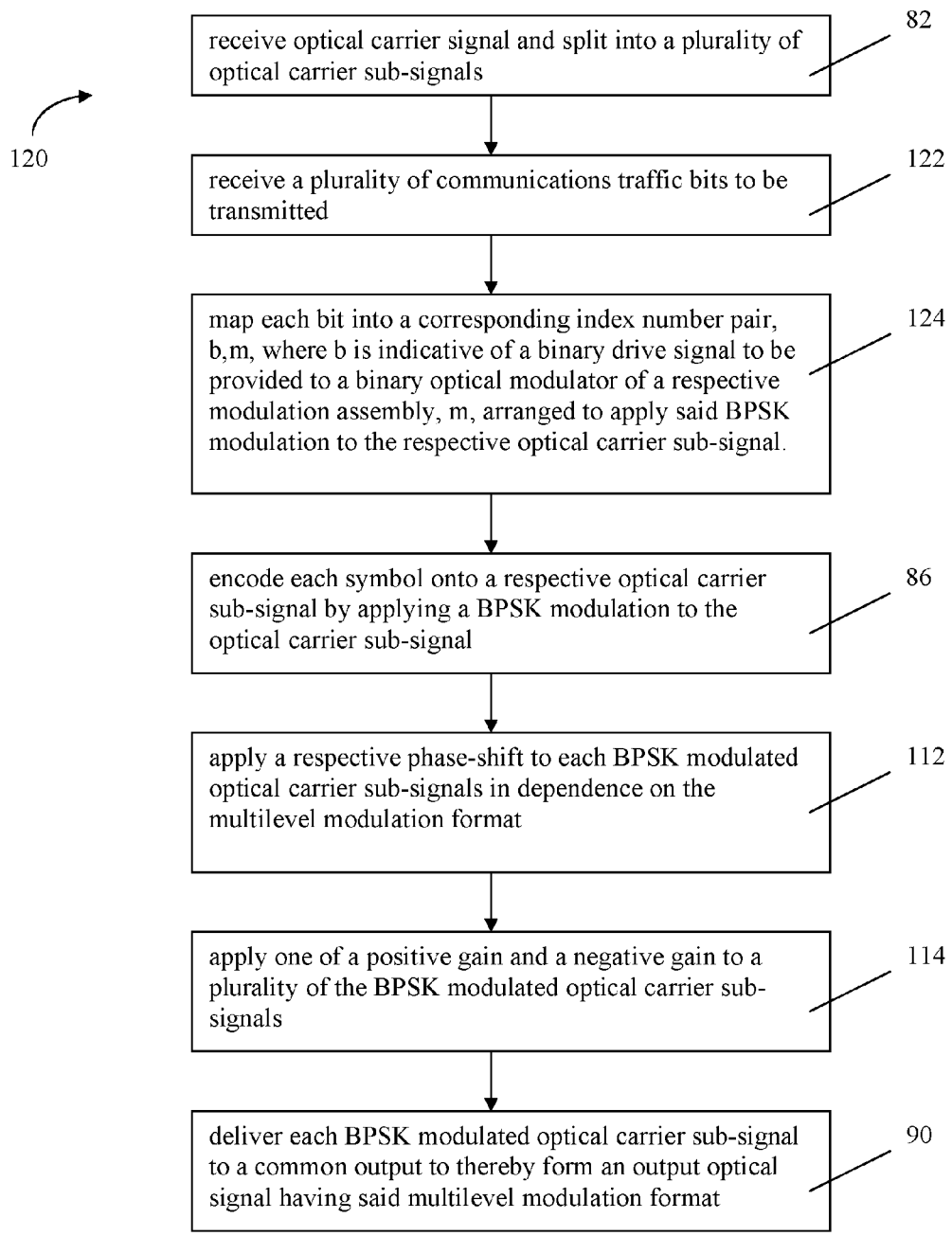
FIG. 9 shows the steps of a method of encoding communications traffic bits onto an optical carrier signal in a multilevel modulation format according to an eighth embodiment of the invention.

FIG. 9 shows the steps of a method 120 of encoding communications traffic bits onto an optical carrier signal in a multilevel modulation format according to an eighth embodiment of the invention. The method 120 of this embodiment is similar to the method 110 of the previous embodiment, with the following modifications. The same reference numbers are retained for corresponding steps.

In this embodiment, the pre-selected multilevel modulation format has an even number of symbols. The method comprises receiving a plurality of communications bits 122 and mapping each communications bit into a corresponding index number pair, b,m, 124. b is indicative of a binary drive signal, for example a binary drive signal selected from the set −1, 1 or the set 0,1. m is indicative of the modulation assembly of which the binary optical modulator is to be driven by the drive signal. Each bit is therefore encoded into a respective symbol of the selected modulation format by driving the binary optical modulator 22 of the m-th modulation assembly 62 with a binary drive signal −1 or 1 (or alternatively, 0 or 1).

By combining the BPSK modulation optical carrier sub-signals each symbol in the constellation diagram of the selected multilevel modulation format is provided. The symbols are generated serially. The phase position and amplitude of a symbol within the constellation diagram is controlled by controlling the phase shift and gain applied to the optical carrier sub-signal which was modulated to generate the symbol.

Figure 10:
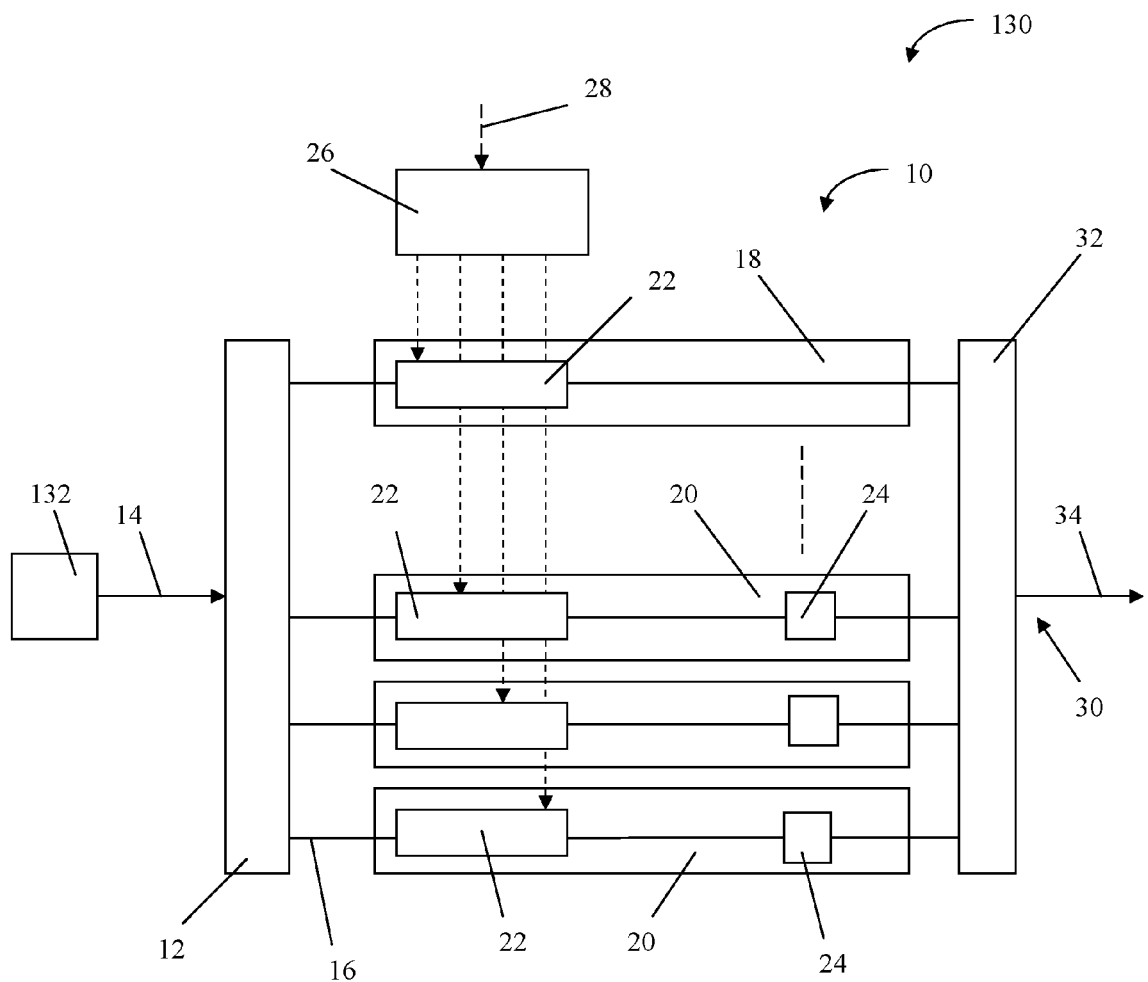
FIG. 10 is a schematic representation of an optical transmitter according to a ninth embodiment of the invention.

A ninth embodiment of the invention provides an optical transmitter 130, as shown in FIG. 10.

The optical transmitter 130 comprises an optical source 132 and an optical modulator 10, according to the first embodiment of the invention, shown in FIG. 1. The optical source 132 is arranged to generate an optical carrier signal 14. The optical modulator 10 is arranged to receive the optical carrier signal 14 from the optical source 132. The operation of the optical modulator 10 is as described above.

It will be appreciated that any of the optical modulators 40, 50, 60 described above may alternatively be used.

Figure 11:
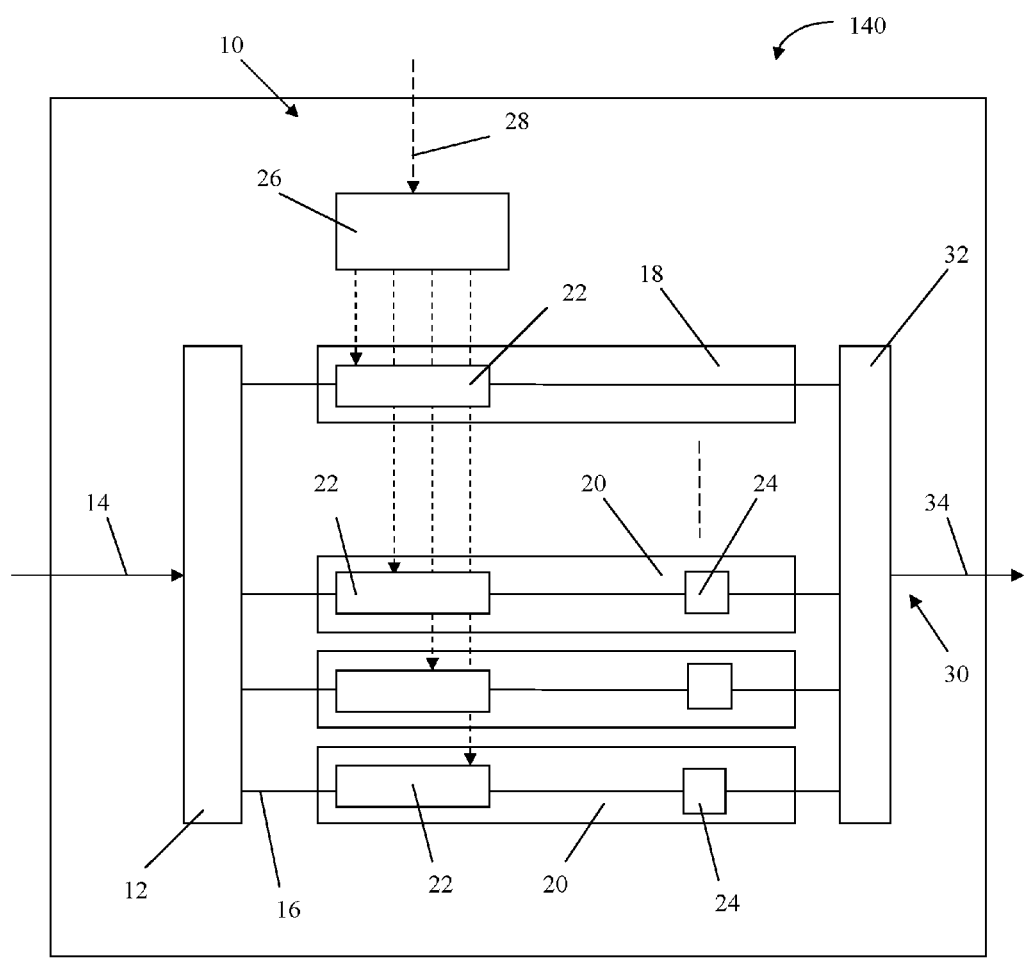
FIG. 11 is a schematic representation of an optical communications network node according to a tenth embodiment of the invention.

A tenth embodiment of the invention provides communications network node 140, as shown in FIG. 11.

The node 140 comprises an optical modulator 10, according to the first embodiment of the invention, shown in FIG. 1. The operation of the optical modulator 10 is as described above.

It will be appreciated that any of the optical modulators 40, 50, 60 described above may alternatively be used.

An eleventh embodiment of the invention provides a data carrier having computer readable instructions embodied therein. The computer readable instructions are for providing access to resources available on a processor. The computer readable instructions comprise instructions to cause the processor to perform any of the steps of the method 80 of encoding communications traffic bits onto an optical carrier signal in a multilevel modulation format as described above in relation to FIG. 6.

It will be appreciated that the computer readable instructions may alternatively comprise instructions to cause the processor to perform any of the steps of any of the methods 100, 110, 120 of encoding communications traffic bits onto an optical carrier signal in a multilevel modulation format as described above in relation to FIGS. 7 to 9.

The invention claimed is:

1. An optical modulator comprising:
an optical splitter arranged to receive an optical carrier signal and arranged to split power of the optical carrier signal into a plurality of optical carrier sub-signals;
a plurality of modulation assemblies each arranged to receive a respective one of said optical carrier sub-signals, wherein each modulation assembly comprises a binary optical modulator arranged to receive the respective optical carrier sub-signal and arranged to apply a binary phase shift keyed (BPSK) modulation to said optical carrier sub-signal to form a respective BPSK modulated optical sub-signal for use in mapping a pair of symbols symmetric about an origin on a symbol constellation, and wherein at least some of the plurality of the modulation assemblies comprise a phase-shifter, each said phase-shifter being arranged to receive the respective BPSK modulated optical sub-signal and being arranged to apply a respective phase shift to the respective BPSK modulated optical sub-signal in dependence on a pre-selected multilevel modulation format to generate a phase shifted BPSK modulated optical sub-signal, wherein two of the modulation assemblies are utilized when the pre-selected multilevel modulation format is quadrature PSK (QPSK) and four of the modulation assemblies are utilized when the pre-selected multilevel modulation format is 8-PSK;
an encoding apparatus arranged to receive communications traffic bits to be transmitted and arranged to map each communications traffic bit into a respective symbol of the symbol constellation based on the multilevel modulation format, the encoding apparatus being arranged to generate and transmit a respective drive signal to the binary optical modulator of a respective one of the modulation assemblies, each drive signal being arranged to cause a respective binary optical modulator to apply said BPSK modulation to thereby encode the respective pair of symbols of the symbol constellation onto the respective optical carrier sub-signal, and wherein the respective phase shift, where applied, causes the respective pair of symbols to be phase-positioned about the origin so as to have different phase locations from other symbols for mapping on the symbol constellation;
an output; and
a combiner arranged to receive outputs from the respective modulation assemblies and arranged to combine the outputs from the respective modulation assemblies to generate an output optical signal at the output.

2. The optical modulator as claimed in claim 1, wherein the optical modulator further comprises a modulation format controller arranged to select the pre-selected multilevel modulation format from a set of multilevel modulation formats and to select a number of modulation assemblies from the plurality of modulation assemblies for operational use based on the pre-selected multilevel modulation format.

3. The optical modulator as claimed in claim 1, wherein the plurality of modulation assemblies has at least one modulation assembly not containing a phase-shifter.

4. The optical modulator as claimed in claim 1, wherein each phase-shifter comprises a variable phase-shifter and the optical modulator further comprises a phase shift controller arranged to generate and transmit a respective phase shift control signal to each variable phase-shifter, each phase shift control signal being arranged to cause a respective variable phase-shifter to be arranged to apply a respective phase shift in dependence on the pre-selected multilevel modulation format.

5. The optical modulator as claimed in claim 1, wherein one or more of the modulation assemblies further comprise a gain element arranged to apply one of a positive gain and a negative gain to the respective BPSK modulated optical sub-signal to respectively amplitude position symbols for mapping on the symbol constellation.

6. The optical modulator as claimed in claim 1, wherein each modulation assembly further comprises a variable gain element arranged to apply one of a positive gain, a negative gain and zero gain to the respective BPSK modulated optical sub-signal to respectively amplitude position symbols for mapping on the symbol constellation, and wherein the optical modulator further comprises a gain controller arranged to generate and transmit a respective gain control signal to each variable gain element, each gain control signal being arranged to cause a respective variable gain element to be arranged to apply a respective gain in dependence on the pre-selected multilevel modulation format.

7. The optical modulator as claimed in claim 1, wherein the pre-selected multilevel modulation format has an even number of symbols and the encoding apparatus is arranged to receive the communications traffic bits and the encoding apparatus is arranged to map each communications traffic bit into a corresponding index number pair, b, m, where b is indicative of a binary drive signal to be provided to the binary optical modulator of the respective modulation assembly, m.

8. A method of encoding communications traffic bits onto an optical carrier signal in a multilevel modulation format, the method comprising:
receiving an optical carrier signal and splitting power of the optical carrier signal into a plurality of optical carrier sub-signals;
receiving communications traffic bits to be transmitted and mapping each communications traffic bit on to a symbol constellation based on a pre-selected multilevel modulation format;

encoding a respective pair of symbols symmetric out an origin of the symbol constellation onto a respective optical carrier sub-signal by applying a binary phase shift keyed (BPSK) modulation to the respective optical carrier sub-signal to form a respective BPSK modulated optical sub-signal;

applying a respective phase shift to at least some of the BPSK modulated optical sub-signals in dependence on the multilevel modulation format to generate a respective phase shifted BPSK modulated optical sub-signal, wherein the respective phase shift, where applied, causes the respective pair of symbols to be phase-positioned about the origin so as to have different phase locations from other symbols for mapping on the symbol constellation; and combining each phase shifted BPSK modulated optical sub-signal and non-phase shifted BPSK modulated optical sub-signal, at a common output to thereby form an output optical signal, wherein two of the optical carrier sub-signals are utilized when the pre-selected multilevel modulation format is quadrature PSK (QPSK) and four of the optical carrier sub-signals are utilized when the pre-selected multilevel modulation format is 8-PSK.

9. The method as claimed in claim 8, wherein the method comprises selecting the pre-selected multilevel modulation format from a set of multilevel modulation formats and to select a number of BPSK modulation stages for operational use based on the pre-selected multilevel modulation format.

10. The method as claimed in claim 8, wherein for the BPSK modulated optical sub-signals, at least one BPSK modulated optical sub-signal is not subjected to applying the phase shift.

11. The method as claimed in claim 8, wherein one of a positive gain and a negative gain is applied to at least one of the BPSK modulated optical sub-signals to respectively amplitude position symbols for mapping on the symbol constellation.

12. The method as claimed in claim 8, wherein a respective gain is applied to each BPSK modulated optical sub-signal in dependence on the pre-selected multilevel modulation format, the gain being one of a positive gain, a negative gain and zero gain to respectively amplitude position symbols for mapping on the symbol constellation.

13. The method as claimed in claim 8, wherein the pre-selected multilevel modulation format has an even number of symbols and the method comprises receiving the communications traffic bits and mapping each communications traffic bit into a corresponding index number pair, b, m, where b is indicative of a binary drive signal to be provided to a binary optical modulator of a respective modulation assembly, m, arranged to apply said BPSK modulation to the respective optical carrier sub-signal.

14. An optical transmitter comprising:
an optical source arranged to generate an optical carrier signal; and
an optical modulator comprising:

an optical splitter arranged to receive an optical carrier signal and arranged to split power of the optical carrier signal into a plurality of optical carrier sub-signals;

a plurality of modulation assemblies each arranged to receive a respective one of said optical carrier sub-signals, wherein each modulation assembly comprises a binary optical modulator arranged to receive the respective optical carrier sub-signal and arranged to apply a binary phase shift keyed (BPSK) modulation to said optical carrier sub-signal to form a respective BPSK modulated optical sub-signal for use in mapping a pair of symbols symmetric about an origin on a symbol constellation, and wherein at least some of the plurality of the modulation assemblies comprise a phase-shifter, each said phase-shifter being arranged to receive the respective BPSK modulated optical sub-signal and being arranged to apply a respective phase shift to the respective BPSK modulated optical sub-signal in dependence on a pre-selected multilevel modulation format to generate a phase shifted BPSK modulated optical sub-signal, wherein two of the modulation assemblies are utilized when the pre-selected multilevel modulation format is quadrature PSK (QPSK) and four of the modulation assemblies are utilized when the pre-selected multilevel modulation format is 8-PSK;

an encoding apparatus arranged to receive communications traffic bits to be transmitted and arranged to map each communications traffic bit into a respective symbol of the symbol constellation based on the multilevel modulation format, the encoding apparatus being arranged to generate and transmit a respective drive signal to the binary optical modulator of a respective one of the modulation assemblies, each drive signal being arranged to cause a respective binary optical modulator to apply said BPSK modulation to thereby encode the respective pair of symbols of the symbol constellation onto the respective optical carrier sub-signal, and wherein the respective phase shift, where applied, causes the respective pair of symbols to be phase-positioned about the origin so as to have different phase locations from other symbols for mapping on the symbol constellation;

an output; and a combiner arranged to receive outputs from the respective modulation assemblies and arranged to combine the outputs from the respective modulation assemblies to generate an output optical signal at the output.

15. The optical modulator as claimed in claim 1, wherein the optical modulator is a part of a communications network node.

* * * * *